(12) United States Patent
Fang et al.

(10) Patent No.: US 11,372,232 B2
(45) Date of Patent: Jun. 28, 2022

(54) LIGHT VALVE, DISPLAY DEVICE AND DISPLAY METHOD

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jiao Fang, Beijing (CN); Wei He, Beijing (CN); Xinghua Li, Beijing (CN); Shi Cheng, Beijing (CN); Jian Yang, Beijing (CN); Wenqiang Chen, Beijing (CN); Qing Chang, Beijing (CN); Lixia Huang, Beijing (CN); Shou Ye, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 565 days.

(21) Appl. No.: 16/340,620

(22) PCT Filed: Jan. 4, 2018

(86) PCT No.: PCT/CN2018/071323
§ 371 (c)(1),
(2) Date: Apr. 9, 2019

(87) PCT Pub. No.: WO2019/000898
PCT Pub. Date: Jan. 3, 2019

(65) Prior Publication Data
US 2020/0049973 A1 Feb. 13, 2020

(30) Foreign Application Priority Data
Jun. 28, 2017 (CN) .......................... 201710509013.5

(51) Int. Cl.
*G02B 26/02* (2006.01)

(52) U.S. Cl.
CPC .................................... *G02B 26/02* (2013.01)

(58) Field of Classification Search
CPC ...................................................... G02B 26/02
(Continued)

(56) References Cited

U.S. PATENT DOCUMENTS

2012/0086999 A1    4/2012  Ishii
2012/0307335 A1*  12/2012  Kuriyagawa ........ G02B 26/023
                                                                    359/230
(Continued)

FOREIGN PATENT DOCUMENTS

CN         1725067 A      1/2006
CN       102236163 A     11/2011
(Continued)

OTHER PUBLICATIONS

First Office Action for Chinese Application No. 201710509013.5, dated May 13, 2019, 9 Pages.
(Continued)

*Primary Examiner* — Marin Pichler
*Assistant Examiner* — Mitchell T Oestreich
(74) *Attorney, Agent, or Firm* — Brooks Kushman P.C.

(57) ABSTRACT

The present disclosure provides a light valve, a display device and a display method. The light valve includes: at least one fixation member fixed onto a substrate; and at least one movable member capable of moving relative to the fixation member to switch the light valve between a first state where the light valve is provided with a slit through which a light beam passes and a second state where the light valve prevents the light beam from passing therethrough.

12 Claims, 4 Drawing Sheets

(58) Field of Classification Search
USPC .......................................................... 359/230
See application file for complete search history.

(56) References Cited

U.S. PATENT DOCUMENTS

| | | |
|---|---|---|
| 2014/0002512 A1 | 1/2014 | Shen et al. |
| 2015/0015828 A1 | 1/2015 | Kim et al. |
| 2016/0335939 A1 | 11/2016 | Yang et al. |
| 2017/0039961 A1 | 2/2017 | Sasagawa |
| 2018/0164578 A1 | 6/2018 | Xu |

FOREIGN PATENT DOCUMENTS

| | | | |
|---|---|---|---|
| CN | 102243369 A | | 11/2011 |
| CN | 103513418 A | | 1/2014 |
| CN | 104280928 A | | 1/2015 |
| CN | 104360559 A | | 2/2015 |
| CN | 104795046 A | | 7/2015 |
| CN | 105137592 A | * | 12/2015 |
| CN | 105137592 A | | 12/2015 |
| CN | 105161022 A | | 12/2015 |
| CN | 105589252 A | | 5/2016 |
| CN | 105895023 A | | 8/2016 |
| CN | 106125294 A | | 11/2016 |
| JP | H05134270 A | | 5/1993 |
| JP | 2005221957 A | | 8/2005 |

OTHER PUBLICATIONS

International Search Report and Written Opinion for Application No. PCT/CN2018/071323, dated Mar. 28, 2018, 11 Pages.
Second Office Action for Chinese Application No. 201710509013.5, dated Jul. 12, 2019, 9 Pages.

\* cited by examiner

LIGHT VALVE, DISPLAY DEVICE AND DISPLAY METHOD

CROSS-REFERENCE TO RELATED APPLICATIONS

This application is the U.S. national phase of PCT Application No. PCT/CN2018/071323 filed on Jan. 4, 2018, which claims priority to Chinese Patent Application No. 201710509013.5 filed on Jun. 28, 2017, which are incorporated herein by reference in their entireties.

TECHNICAL FIELD

The present disclosure relates to the field of display technology, in particular to a light valve, a display device and a display method.

BACKGROUND

Currently, a display device is mainly manufactured using two techniques, i.e., thin film transistor liquid crystal display (TFT LCD) and active matrix organic light-emitting diode (AMOLED). For the TFT LCD technique, the light valve is made of a liquid crystal material. However, due to the properties (e.g., the optical properties) of the liquid crystal material, there may exist for the TFT LCD technique such disadvantages as slow response, narrow viewing angle and being easy to generate afterimages. For the AMOLED technique, there exist such disadvantages as complex manufacture process, too high manufacture cost and uneven display brightness.

SUMMARY

In one aspect, the present disclosure provides in some embodiments a light valve, including: at least one fixation member fixed onto a substrate; and at least one movable member capable of moving relative to the fixation member to switch the light valve between a first state where the light valve is provided with a slit through which a light beam passes and a second state where the light valve prevents the light beam from passing therethrough.

In some possible embodiments of the present disclosure, the slit is of an adjustable size.

In some possible embodiments of the present disclosure, the fixation member extends in a direction substantially identical to the movable member.

In some possible embodiments of the present disclosure, the at least one fixation member includes a first fixation member and a second fixation member arranged opposite to each other. The at least one movable member includes: a first movable member flexibly connected to the first fixation member and capable of rotating about a joint between the first fixation member and the first movable member; and a second movable member flexibly connected to the second fixation member and capable of rotating about a joint between the second fixation member and the second movable member. In the first state, the slit is provided between the first movable member and the second movable member to allow the light beam to pass therethrough, and in the second state, the first movable member is in contact with the second movable member.

In some possible embodiments of the present disclosure, the size of the slit varies along with a distance between the first movable member and the second movable member, and the slit is provided with a larger size in the case that the distance between the first movable member and the second movable member is larger.

In some possible embodiments of the present disclosure, the at least one fixation member includes a third fixation member and a fourth fixation member arranged opposite to each other. The at least one movable member includes a third movable member flexibly connected to the third fixation member and capable of rotating about a joint between the third fixation member and the third movable member. In the first state, the slit is provided between the third movable member and the third fixation member to allow the light beam to pass therethrough, and in the second state, the third movable member is in contact with the fourth fixation member.

In some possible embodiments of the present disclosure, the size of the slit varies along with a distance between the third movable member and the fourth fixation member, or along with a rotation angle of the third movable member relative to the third fixation member.

In some possible embodiments of the present disclosure, the slit is of a larger size in the case that the distance between the third movable member and the fourth fixation member is larger.

In some possible embodiments of the present disclosure, the at least one fixation member includes a fifth fixation member and a sixth fixation member arranged opposite to each other and each provided with a perforated hollowed-out structure. The at least one movable member includes a fourth movable member and a fifth movable member, the fourth movable member and the fifth movable member being arranged opposite to each other, the fourth movable member and the fifth movable member being inserted into the hollowed-out structures of the fifth fixation member and the sixth fixation member respectively, and each of the fourth movable member and the fifth movable member being capable of moving along a horizontal axis of the corresponding hollowed-out structure. In the first state, the slit is provided between the fourth movable member and the fifth movable member to allow the light beam to pass therethrough, and in the second state, the fourth movable member is in contact with the fifth movable member.

In some possible embodiments of the present disclosure, the size of the slit varies along with a distance between the fourth movable member and the fifth movable member. The slit is of a larger size in the case that the distance between the fourth movable member and the fifth movable member is larger.

In some possible embodiments of the present disclosure, the fixation member is arranged substantially parallel to the movable member, and the movable member is capable of moving on a plane substantially parallel to the fixation member. In the first state, the movable member and the fixation member cooperate with each other to provide the light valve with the slit through which the light beam is allowed to pass, and in the second state, the movable member and the fixation member cooperate with each other to enable the light valve to prevent the light beam from passing therethrough.

In some possible embodiments of the present disclosure, the light valve further includes a guide slot arranged between the fixation member and the movable member, and the movable member is capable of moving along the guide slot.

In some possible embodiments of the present disclosure, the size of the slit varies along with a movement distance of the movable member relative to the fixation member.

In some possible embodiments of the present disclosure, each of the fixation member and the movable member is made of silicon.

In another aspect, the present disclosure provides in some embodiments a display device, including: a first base substrate and a second base substrate arranged opposite to each other; TFT and a plurality of the above-mentioned light valves arranged on the first base substrate, each of the light valves being capable of being switched between a first state and a second state under the control of the TFTs; and a plurality of color filter units arranged on the first base substrate or the second base substrate, wherein the plurality of color filter units correspond to the plurality of light valves in a one-to-one manner.

In some possible embodiments of the present disclosure, the display device further includes a reflection layer arranged at a side of the second base substrate facing the light valves, and the plurality of color filter units is arranged between the reflection layer and the light valves.

In some possible embodiments of the present disclosure, the display device further includes a backlight source arranged at a side of the first base substrate away from the light valves.

In yet another aspect, the present disclosure provides in some embodiments a display method for the above-mentioned display device, including a step of applying an electrical signal to the fixation member and/or the movable member, to enable the movable member to move relative to the fixation member, thereby to switch each light valve between a first state where the light valve is provided with a slit through which a light beam is allowed to pass and a second state where the light valve is capable of preventing the light beam from passing therethrough.

In some possible embodiments of the present disclosure, the light valve includes a first fixation member and a second fixation member arranged opposite to each other, a first movable member flexibly connected to the first fixation member and capable of rotating about a joint between the first fixation member and the first movable member, and a second movable member flexibly connected to the second fixation member and capable of rotating about a joint between the second fixation member and the second movable member. The display method further includes: in the first state, applying electrical signals having an identical polarity to the first movable member and the second movable member, to provide the slit between the first movable member and the second movable member, thereby to allow the light beam to pass therethrough; and in the second state, enabling the first movable member to be in contact with the second movable member.

In some possible embodiments of the present disclosure, the light valve includes a fixation member fixedly arranged on a first base substrate, and a movable member arranged substantially parallel to the fixation member and capable of moving on a plane substantially parallel to the fixation member. The display method further includes: in the first state, applying electrical signals having opposite polarities to the movable member and the fixation member, to enable the movable member to move in a direction close to the fixation member in such a manner that a sum of orthogonal projections of the movable member and the fixation member onto the first base substrate covers a portion of an orthogonal projection of a color filter unit corresponding to the light valve onto the first base substrate; and in the second state, applying electrical signal having an identical polarity to the movable member and the fixation member, to enable the movable member to move in a direction away from the fixation member in such a manner that a sum of orthogonal projections of the movable member and the fixation member onto the first base substrate covers the entire orthogonal projection of the color filter unit corresponding to the light valve onto the first base substrate.

In some possible embodiments of the present disclosure, the slit between the first movable member and the second movable member is of a larger size in the case that the electrical signal at a larger intensity is applied in the first state.

DETAILED DESCRIPTION

Figure 1:
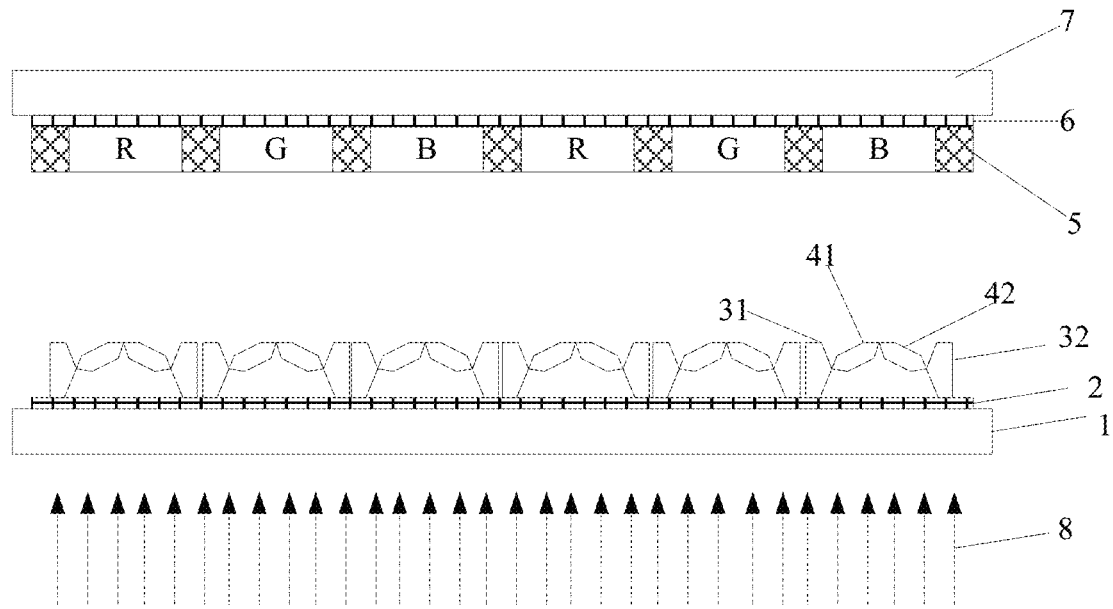
FIG. 1 is a schematic view showing a display device according to some embodiments of the present disclosure.

In order to make the objects, the technical solutions and the advantages of the present disclosure more apparent, the present disclosure will be described hereinafter in a clear and complete manner in conjunction with the drawings and embodiments.

An object of the present disclosure is to provide a light valve, a display device and a display method, to reduce the manufacture cost of the display device, and improve a response speed and a display effect of the display device.

The present disclosure provides in some embodiments a light valve, which includes: at least one fixation member fixed onto a substrate; and at least one movable member capable of moving relative to the fixation member to switch the light valve between a first state where the light valve is provided with a slit of an adjustable size through which a light beam passes and a second state where the light valve prevents the light beam from passing therethrough (e.g., the light value is not provide with any slit through which the light beam is allowed to pass).

According to the light valve in the embodiments of the present disclosure, through controlling the movement of the movable member relative to the fixation member, it is able to adjust the size of the slit, thereby to control an intensity of the light beam passing through a color filter unit, thereby to display an image without any polarizer. As a result, it is able to simplify the structure of a display device, thereby to provide a thinner and lighter display device, and reduce the manufacture cost thereof. In addition, as compared with a liquid crystal display device, it is able for the display device in the embodiments of the present disclosure to provide a rapid response speed and a wide viewing angle, thereby to improve a display effect.

To be specific, the fixation member may extend on the substrate, and have a substantially elongated shape. The movable member may extend in a direction substantially identical to the fixation member.

It should be appreciated that, in the case that the movable member moves (or travels) relative to the fixation member, the movable member may move linearly (e.g., translate) or rotate (e.g., swing) relative to the fixation member, which will not be particularly defined herein.

In some possible embodiments of the present disclosure, the light valve may include: a first fixation member and a second fixation member arranged opposite to each other; a first movable member flexibly connected to the first fixation member and capable of rotating about a joint between the first fixation member and the first movable member; and a second movable member flexibly connected to the second fixation member and capable of rotating about a joint between the second fixation member and the second movable member. In the first state, the slit may be provided between the first movable member and the second movable member to allow the light beam to pass therethrough. The size of the slit may vary along with a distance between the first movable member and the second movable member, and the slit may be provided with a larger size in the case that the distance between the first movable member and the second movable member is larger. In the second state, the first movable member may be in contact with the second movable member.

In another possible embodiment of the present disclosure, the light valve may include: a fixation member arranged on a substrate; and a movable member arranged substantially parallel to the fixation member and capable of moving on a plane substantially parallel to the fixation member. In the first state, the movable member and the fixation member may cooperate with each other to provide the light valve with the slit through which the light beam is allowed to pass, and in the second state, the movable member and the fixation member may cooperate with each other so as to enable the light valve to prevent the light beam from passing therethrough.

In the case that the light valve includes the fixation member arranged on the substrate and the movable member arranged substantially parallel to the fixation member, the light valve may further include a guide slot arranged between the fixation member and the movable member, and the movable member is capable of moving along the guide slot.

To be specific, the light valve may further include a transparent layer arranged between the fixation member and the movable member, the guide slot may be formed in the transparent layer, and the movable member is capable of moving along the guide slot.

The present disclosure further provides in some embodiments a display device, which includes: a first base substrate and a second base substrate arranged opposite to each other; TFTs and a plurality of the above-mentioned light valves arranged on the first base substrate, each of the light valves being capable of being switched between a first state and a second state under the control of the TFTs; and a plurality of color filter units arranged on the first base substrate or the second base substrate, wherein the plurality of color filter units correspond to the plurality of light valves in a one-to-one manner.

The display device may be any product or member having a display function, e.g., television, display, digital photo frame, mobile phone or flat-panel computer. The display device may further include a flexible circuit board, a printed circuit board and a back plate.

According to the display device in the embodiments of the present disclosure, through controlling the movement of the movable member relative to the fixation member, it is able to adjust the size of the slit, thereby to control an intensity of the light beam passing through a color filter unit, thereby to display an image without any polarizer. As a result, it is able to simplify the structure of the display device, thereby to provide a thinner and lighter display device, and reduce the manufacture cost thereof. In addition, as compared with a liquid crystal display device, it is able for the display device in the embodiments of the present disclosure to provide a rapid response speed and a wide viewing angle, thereby to improve a display effect.

Figure 2:
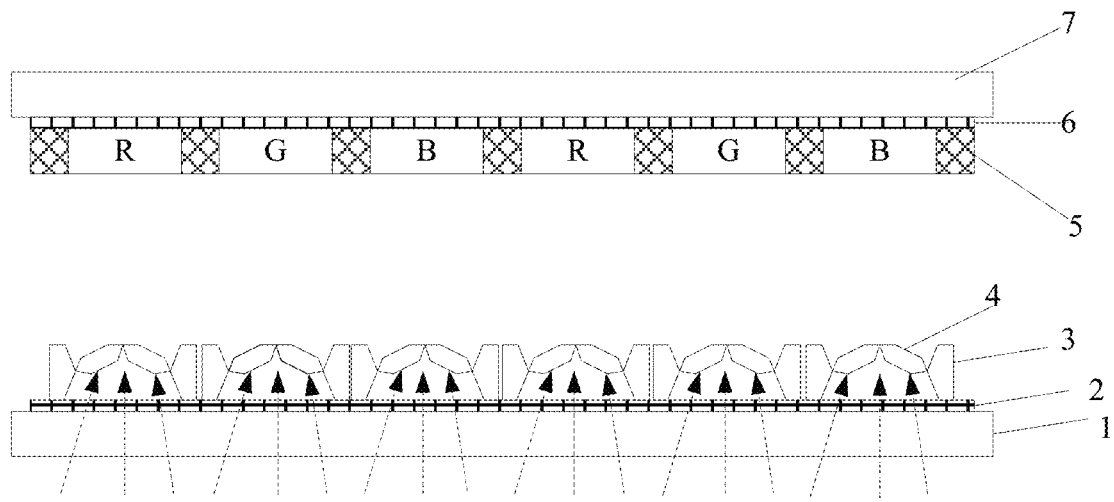
FIG. 2 is a schematic view showing the display device in the case of not displaying any image according to some embodiments of the present disclosure.
Figure 3:
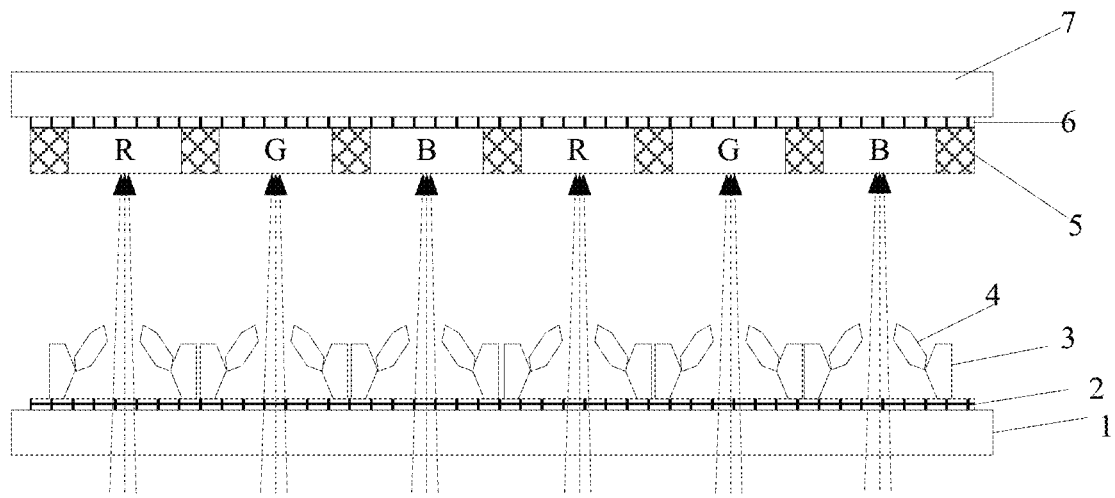
FIG. 3 is a schematic view showing the display device in the case of displaying an image according to some embodiments of the present disclosure.

To be specific, as shown in FIG. 1 through FIG. 3, the display device includes base substrates 1 and 7 arranged opposite to each other. A reflection layer 6 and a plurality of color filter units 5 are arranged on the base substrate 7. A TFT array layer 2 and a plurality of light valves are arranged on the base substrate 1. Through the TFT array layer 2, it is able to control a state of each light valve, thereby to switch the light valve between the first state and the second state.

In the embodiments of the present disclosure, the light values may correspond to the color filter units 5 respectively, or one color filter unit may corresponding to more than one light valves. As shown in FIG. 1 through FIG. 3, each light valve includes a fixation member 3 and a movable member 4. The fixation member 3 includes a first fixation member 31 and a second fixation member 32 arranged opposite to each other. The movable member 4 includes a first movable member 41 flexibly connected to the first fixation member 31 and capable of swinging about a joint between the first fixation member 31 and the first movable member 41, and a second movable member 42 flexibly connected to the second fixation member 32 and capable of swinging about a joint between the second fixation member 32 and the second movable member 42.

In the first state, the light beam 8 is allowed to pass through the light valve, while in the second state, the light beam 8 is not allowed to pass through the light valve. To be specific, in the first state, a slit is provided between the first movable member 41 and the second movable member 42, so as to allow the light beam 8 to pass therethrough. A size of the slit varies along with a distance between the first movable member 41 and the second movable member 42. The larger the distance between the first movable member 41 and the second movable member 42 is, the larger a size of the slit is, and the more the light beams passing through the corresponding color filter unit 5 are. In the second state, the first movable member 41 is in contact with the second movable member 42, and no slit is provided between the first movable member 41 and the second movable member 42, i.e., no light beam is allowed to pass through the corresponding color filter unit 5.

The first movable member 41 and the second movable member 42 are controlled by a TFT switch. As shown in FIG. 2, in the case that no power is supplied to the TFT switch on the base substrate 1, the first movable member 41 and the second movable member 42 of the same light valve may not carry any charges, and no slit may be provided between the first movable member 41 and the second movable member 42. At this time, an ambient light beam may be reflected by the first movable member 41 and the second movable member 42, and no light beam may pass through the corresponding color filter unit 5, i.e., the display device may not display any image.

As shown in FIG. 3, in the case that the power is supplied to the TFT switch on the base substrate, the first movable member 41 and the second movable member 42 of the same light valve may carry charges having an identical polarity, and an electrostatic repulsive force may be generated therebetween. The size of the slit between the first movable member 41 and the second movable member 42 depends on a voltage. The larger the voltage is, the larger the slit between the first movable member 41 and the second movable member 42 is. The ambient light beam may pass sequentially through the base substrate 1, the slit between the first movable member 41 and the second movable member 42, and the corresponding color filter unit 5 to the reflection layer 6, and then be reflected by the reflection layer 6 to a human eye, so as to display the image.

In the embodiments of the present disclosure, the display device is provided with the reflection layer 6, i.e., it is a reflective display device which may display the image by reflecting the ambient light beam. Of course, the display device may also be a transmissive display device. In the case that the display device is the transmissive display device, it may further include a backlight source arranged at a side of the base substrate 1 away from the light valve, and no reflection layer 6 may be arranged on the base substrate 7. In the case that no power is supplied to the TFT switch on the base substrate 1, the first movable member 41 and the second movable member 42 of the same light valve may not carry any charges, and no slit may be provided between the first movable member 41 and the second movable member 42. At this time, a light beam from the backlight source may be reflected by the first movable member 41 and the second movable member 42, and no light beam may pass through the corresponding color filter unit 5, i.e., the display device may not display any image. In the case that the power is supplied to the TFT switch on the base substrate 1, the first movable member 41 and the second movable member 42 of the same light valve may carry charges having an identical polarity, and an electrostatic repulsive force may be generated therebetween. The size of the slit between the first movable member 41 and the second movable member 42 depends on the voltage. The larger the voltage is, the larger the slit between the first movable member 41 and the second movable member 42 is. The light beam from the backlight source may pass sequentially the base substrate 1, the slit between the first movable member 41 and the second movable member 42, and the corresponding color filter unit 5 to the human eye, so as to display the image.

In some possible embodiments of the present disclosure, the movable member and the fixation member of the light valve may each be made of silicon. Based on properties of silicon, monocrystalline silicon follows Hooke's law, and nearly no elastic hysteresis may occur. Hence, almost no power consumption may occur, and a movement characteristic of monocrystalline silicon is very reliable. In addition, a member made of silicon is uneasy to be broken, so its service cycle may be more than trillion times. A polycrystalline silicon layer may be deposited onto the base substrate, and then patterned through a planographic printing process or an etching process, so as to acquire the desired structure. To be specific, the polycrystalline silicon layer may be etched, so as to remove a portion of the polycrystalline silicon layer corresponding to the joint between the first fixation member and the first movable member, and remove a portion of the polycrystalline silicon layer corresponding to the joint between the second fixation member and the second movable member, so that the first movable member is capable of rotating about the joint between the first fixation member and the first movable member, and the second movable member is capable of rotating about the joint between the second fixation member and the second movable member.

Figure 6:
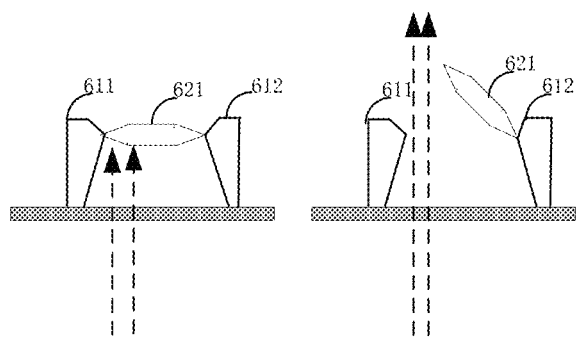
FIG. 6 is a schematic view showing a light valve according to some embodiments of the present disclosure.

In some possible embodiments of the present disclosure, an additional movable member (i.e., a third movable member 621) may be further provided. The third movable member may be flexibly connected to one of two fixation members (i.e., a third fixation member 611 and a fourth fixation member 612). In the first state, the slit may be provided between the third movable member 621 and the other of the two fixation members (e.g., the fourth fixation member 612) so as to allow the light beam to pass therethrough. The lager the distance between the third movable member and the fourth fixation member is, the larger the size of the slit is. In the second state, the third movable member may be in contact with the other of the two fixation members, and no slit may be provided therebetween, as shown in FIG. 6.

Figure 7:
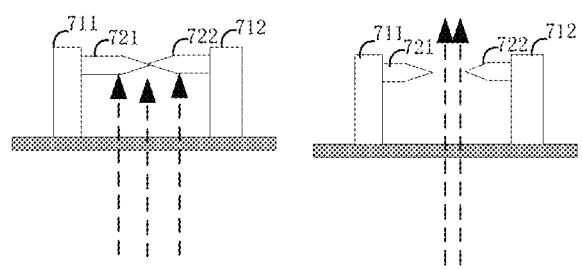
FIG. 7 is another schematic view showing the light valve according to some embodiments of the present disclosure.

In some possible embodiments of the present disclosure, each of two fixation members (i.e., a fifth fixation member 711 and a sixth fixation member 712) may each be provided with a perforated hollowed-out structure, and two movable members (i.e., a fourth movable member 721 and a fifth movable member 722) may be inserted into the hollowed-out structures respectively and may each move along an axis of the corresponding hollowed-out structure (i.e., a direction substantially parallel to the base substrate). The two movable members may move toward each other until they are in contact with each other (i.e., in the second state). Also, the two movable members may move away from each other so as to provide the slit therebetween, thereby to allow the light beam to pass therethrough. The larger the distance between the fourth movable member and the fifth movable member is, the lager the size of the slit is, as shown in FIG. 7.

In addition, In some possible embodiments of the present disclosure, the movable members (e.g., the first movable member 41 and the second movable member 42) may each have a regular hexagonal cross section on a plane substantially perpendicular to the base substrate (e.g., in the second state, two corresponding vertices of two hexagons may be in contact with each other), and the movable members may be symmetrical with each other relative to an intermediate line between the first fixation member and the second fixation member substantially perpendicular to the base substrate. It should be appreciated that, the structure and the shape of each of the first movable member and the second movable member are for illustrative purposes only. For example, each of the first movable member and the second movable member may also have a trapezoidal cross section on the plane substantially perpendicular to the base substrate (e.g., in the second state, one lower vertex of one trapezoid may be in contact with a corresponding one lower vertex of the other trapezoid). In addition, the first movable member and the second movable member may not be arranged symmetrical with each other.

Figure 4:
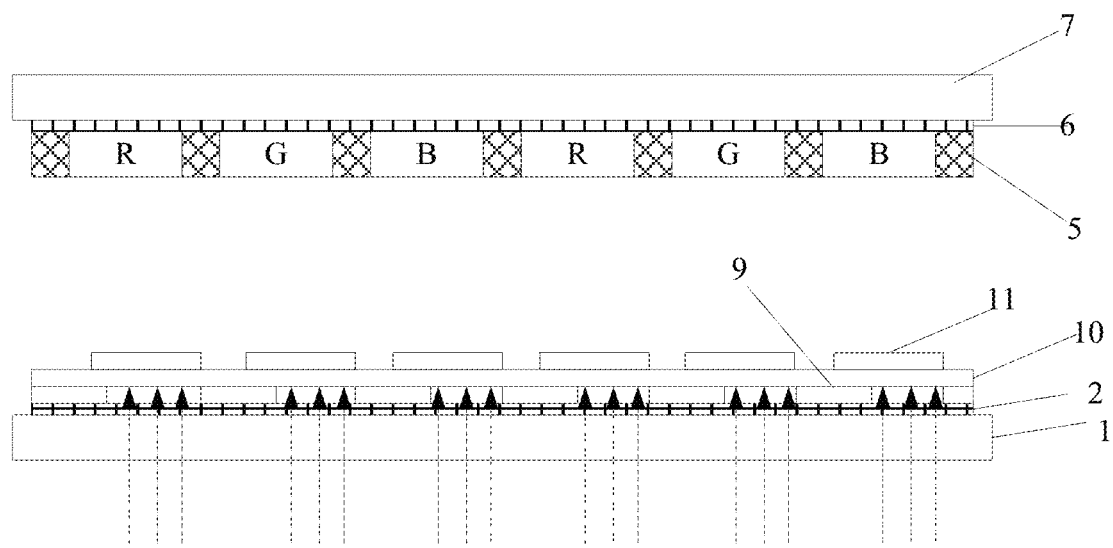
FIG. 4 is another schematic view showing the display device in the case of not displaying any image according to some embodiments of the present disclosure.
Figure 5:
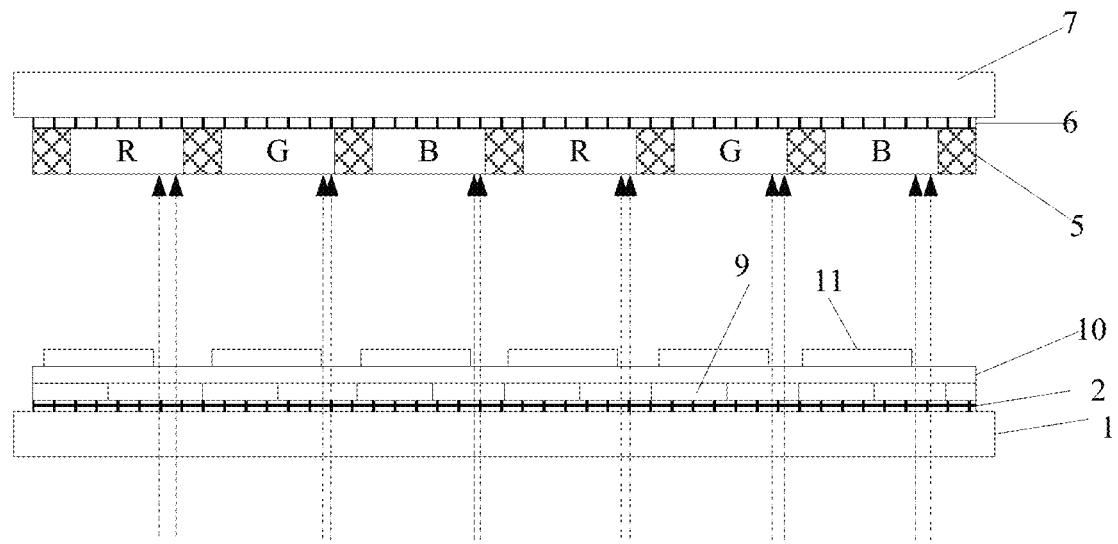
FIG. 5 is another schematic view showing the display device in the case of displaying an image according to some embodiments of the present disclosure.

In another possible embodiment of the present disclosure, as shown in FIG. 4 and FIG. 5, the display device includes substrates 1 and 7 arranged opposite to each other. A reflection layer 6 and a plurality of color filter units 5 are arranged on the base substrate 7, while a TFT array layer 2 and a plurality of light valves are arranged on the base substrate 1. The TFT array layer 2 may be used to control a state of each light valve, so as to switch the light valve between a first state and a second state. The light valves correspond to the color filter units 5 in a one-to-one manner. Of course, one color filter unit may correspond to more than one light valve. As shown in FIG. 4 and FIG. 5, the light valve includes: a fixation member 9 fixedly arranged on the base substrate 1; a transparent layer 10 arranged on the fixation member 9, a guide slot being formed in the transparent layer 10; and a movable member 11 arranged on the transparent layer 10 and capable of moving along the guide slot 11 so as to move on a plane substantially parallel to the fixation member 9. In the first state, the movable member 11 and the fixation member 9 cooperate with each other so as to provide each light valve with a slit through which a light beam is allowed to pass. In the second state, the movable member 11 and the fixation member 9 cooperate with each other so as to enable the light valve to present the light beam from passing therethrough, i.e., so as not to provide the light valve with any slit.

Voltages may be applied to the movable member 11 and the fixation member 9, so as to generate an electrostatic repulsive force or an electrostatic adsorptive force, and move the movable member 11 to the left or to the right. In this way, it is able to adjust the size of the slit, thereby to change the amount of the light beams passing through the slit.

The movable member 11 and the fixation member 9 are controlled by a TFT switch. As shown in FIG. 4, through the voltages applied to the movable member 11 and the fixation member 9, it is able to generate the electrostatic repulsive force therebetween, thereby to move the movable member 11 to the right relative to the fixation member 9. The light beam may not be allowed to pass through the light valve (e.g., the light valve may not be provided with any slit). At this time, the ambient light beam may be reflected by the movable member 11 and the fixation member 9, and no light beam may pass through the corresponding color filter unit 5, i.e., the display device may not display any image.

As shown in FIG. 5, through the voltages applied to the movable member 11 and the fixation member 9, it is able to generate the electrostatic adsorptive force therebetween. A size of the electrostatic adsorptive force depends on the voltage. The larger the voltage is, the larger the electrostatic adsorptive force between the movable member 11 and the fixation member 9 is. The movable member 11 may move to the left relative to the fixation member 9, and the light valve may be provided with the slit so as to allow the light beam to pass therethrough. The larger the electrostatic adsorptive force between the movable member 11 and the fixation member 9 is, the larger the size of the slit is, and the more the light beams passing through the color filter unit are. At this time, the ambient light beam may pass sequentially through the base substrate 1, the light valve, and the color filter unit 5 to the reflection layer 6, and then be reflected by the reflection layer 6 toward the human eye, so as to display the image.

In the embodiments of the present disclosure, the display device is provided with the reflection layer 6, i.e., it is a reflective display device which may display the image by reflecting the ambient light beam. Of course, the display device may also be a transmissive display device. In the case that the display device is the transmissive display device, it may further include a backlight source arranged at a side of the base substrate 1 away from the light valve, and no reflection layer 6 may be arranged on the base substrate 7. In the case that the electrostatic repulsive force is generated between the movable member 11 and the fixation member 9, the movable member 11 may move to the right relative to the fixation member 9, and the light beam may not be allowed to pass through the light valve (e.g., the light valve may not be provided with any slit). At this time, the light beam from the backlight source may be reflected by the movable member 11 and the fixation member 9 (or merely reflected by the fixation member 9), and no light beam may pass through the corresponding color filter unit 5, i.e., the display device may not display any image. In the case that the electrostatic adsorptive force is generated between the movable member 11 and the fixation member 9, the movable member 11 may move to the left relative to the fixation member 9, and the light valve may be provided with the slit so as to allow the light beam to pass therethrough. At this time, the light beam from the backlight source may pass sequentially through the base substrate 1, the light valve, and the color filter unit 5 to the human eye, so as to display the image.

The present disclosure further provides in some embodiments a display method for the above-mentioned display device, which includes a step of applying an electrical signal to the fixation member and/or the movable member, so as to enable the movable member to move relative to the fixation member, thereby to switch each light valve between a first state where the light valve is provided with a slit with an adjustable size through which a light beam is allowed to pass and a second state where the light valve is capable of preventing the light beam from passing therethrough (e.g., the light valve is not provided with any slit).

According to the display method in the embodiments of the present disclosure, through controlling the movement of the movable member relative to the fixation member, it is able to adjust the size of the slit, thereby to control an intensity of the light beam passing through a color filter unit, thereby to display an image without any polarizer. As a result, it is able to simplify the structure of the display device, thereby to provide a thinner and lighter display device, and reduce the manufacture cost thereof. In addition, as compared with a liquid crystal display device, it is able for the display device in the embodiments of the present disclosure to provide a rapid response speed and a wide viewing angle, thereby to improve a display effect.

In some possible embodiments of the present disclosure, the light valve includes a first fixation member and a second fixation member arranged opposite to each other, a first movable member flexibly connected to the first fixation member and capable of rotating about a joint between the first fixation member and the first movable member, and a second movable member flexibly connected to the second fixation member and capable of rotating about a joint between the second fixation member and the second movable member. The display method further includes: in the first state, applying electrical signals having an identical polarity to the first movable member and the second movable member, so as to provide the slit between the first movable member and the second movable member, thereby to allow the light beam to pass therethrough (the larger the intensity of the electrical signal is, the larger the size of the slit between the first movable member and the second movable member is); and in the second state, not applying any electrical signal to the first movable member and the second movable member, so as to enable the first movable member to be in contact with the second movable member.

In some possible embodiments of the present disclosure, the light valve includes a fixation member fixedly arranged on a first base substrate, and a movable member arranged substantially parallel to the fixation member and capable of moving on a plane substantially parallel to the fixation member. The display method further includes: in the first state, applying electrical signals having opposite polarities to the movable member and the fixation member, so as to enable the movable member to move in a direction close to the fixation member in such a manner that a sum of orthogonal projections of the movable member and the fixation member onto the first base substrate covers a portion of an orthogonal projection of a color filter unit corresponding to the light valve onto the first base substrate; and in the second state, applying electrical signal having an identical polarity to the movable member and the fixation member, so as to enable the movable member to move in a direction away from the fixation member in such a manner that a sum of orthogonal projections of the movable member and the fixation member onto the first base substrate covers the entire orthogonal projection of the color filter unit corresponding to the light valve onto the first base substrate.

The embodiments of the present disclosure further provide a method for fabricating a light valve, which can be applied to fabricate a microelectromechanical V-shaped light valve. The method for fabricating the light valve includes, but is not limited to, depositing polysilicon on a silicon chip by surface micromachining technology and then processing, that is, the V-shaped light valve (swing arm) and the Si substrate are originally in integration; next, a deep etching process is performed, that is, etching towards an inside part of the silicon chip, etching until reaching a sacrificial layer inside the chip; next, this sacrificial layer is etched away after the etching process is completed, so that the structure originally buried inside the chip can move freely, as shown in FIGS. 1 to 7, the left and right swing arms swing upward under the action of the same charge repulsive force.

Specifically, the light valve manufacturing method provided by the embodiment of the present disclosure utilizes surface micromachining technology, sacrificial layer technology, solid phase bonding technology, and the like in the MEMS application of the microelectromechanical system. As a non-limiting example, after the thin film transistor array layer 2 (for example, as shown in FIGS. 1 to 5) is fabricated by a conventional technique, the following steps are performed, including: Step 1: coating a layer of $SiO_2$ film (sacrificial layer), the position of the fixing portion 3 is reserved; Step 2: generating (growing) Si over the sacrificial layer to form the fixing portion 3 and the movable portion 4 (both separated); Step 3: etching the sacrificial layer $SiO_2$ using HF to enable the movable portion 4 is suspended above the thin film transistor array layer 2; Step 4: connecting the movable portion 4 and the fixed portion 3 by a fixed bonding technique (physical method).

In addition, those skilled in the art can understand that the microelectromechanical V-shaped light valve fabricated by the light valve manufacturing method provided by the embodiments of the present disclosure can arrange a gap position between the sub-pixels (R/G/B) (namely, Black Matrix (BM)), thereby increasing a cushion design to ensure the box thickness.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light valve, comprising:
   at least one fixation member fixed onto a substrate; and
   at least one movable member capable of moving relative to the at least one fixation member to switch the light valve between a first state where the light valve is provided with a slit through which a light beam passes and a second state where the light valve prevents the light beam from passing therethrough,
   wherein the at least one fixation member comprises a first fixation member and a second fixation member arranged opposite to each other and each provided with a perforated hollowed-out structure,
   the at least one movable member comprises a first movable member and a second movable member, the first movable member and the second movable member being arranged opposite to each other, the first movable member and the second movable member being inserted into the hollowed-out structures of the first fixation member and the second fixation member respectively, and each of the first movable member and the second movable member being capable of moving along a horizontal axis of the corresponding hollowed-out structure, and
   in the first state, the slit is provided between the first movable member and the second movable member to enable the light beam to pass therethrough, and in the second state, the first movable member is in contact with the second movable member.

2. The light valve according to claim 1, wherein the slit is of an adjustable size.

3. The light valve according to claim 1, wherein size of the slit varies along with a distance between the first movable member and the second movable member, and the slit is of a larger size in a case that the distance between the first movable member and the second movable member is larger.

4. The light valve according to claim 1, wherein each of the first and second fixation members and each of the first and second movable members is made of silicon.

5. A display device, comprising:
   a first base substrate and a second base substrate arranged opposite to each other;
   thin film transistors (TFTs) and a plurality of the light valves according to claim 1 arranged on the first base substrate, each of the light valves being capable of being switched between a first state and a second state under the control of the TFTs; and
   a plurality of color filter units arranged on the first base substrate or the second base substrate, wherein each of the plurality of color filter units corresponds to one or more light valves.

6. The display device according to claim 5, further comprising a reflection layer arranged at a side of the second base substrate facing the light valves, wherein the plurality of color filter units is arranged between the reflection layer and the light valves, wherein the plurality of color filters correspond to the plurality of light valves in a one-to-one manner.

7. The display device according to claim 5, further comprising a backlight source arranged at a side of the first base substrate away from the light valves.

8. A display method for the display device according to claim 5, comprising a step of applying an electrical signal to the first and second fixation members and/or the first and second movable members of each of the light valves, to enable the first and second movable members to move relative to the first and second fixation members, thereby to switch each light valve between a first state where the light valve is provided with a slit through which a light beam passes and a second state where the light valve prevents the light beam from passing therethrough.

9. The display method according to claim 8, wherein the display method further comprises: in the first state, applying electrical signals having an identical polarity to the first movable member and the second movable member, to provide the slit between the first movable member and the second movable member, to allow the light beam to pass therethrough; and in the second state, enabling the first movable member to be in contact with the second movable member, without applying any electrical signals to the first movable member and the second movable member.

10. The display method according to claim 9, wherein the slit between the first movable member and the second movable member is of a larger size in a case that the electrical signal at a larger intensity is applied in the first state.

11. A display method for a display device that includes a first base substrate and a second base substrate arranged opposite to each other, thin film transistors (TFTs) and a plurality of light valves arranged on the first base substrate, and a plurality of color filter units arranged on the first base substrate or the second base substrate, wherein each of the plurality of color filter units corresponds to one or more light valves, and each of the light valves is capable of being switched between a first state and a second state under the control of the TFTs, and wherein each of the light valves includes a fixation member fixed onto the first base substrate, and a movable member capable of moving relative to the fixation member, the method comprising:

for each of the light valves, applying an electrical signal to the fixation member and/or the movable member to enable the movable member to move relative to the fixation member, thereby to switch the light valve between the first state where the light valve is provided with a slit through which a light beam passes and the second state where the light valve prevents the light beam from passing therethrough, and in the first state, applying electrical signals having opposite polarities to the movable member and the fixation member, to enable the movable member to move in a direction close to the fixation member in such a manner that a sum of orthogonal projections of the movable member and the fixation member onto the first base substrate covers a portion of an orthogonal projection of a color filter unit corresponding to the light valve onto the first base substrate, and in the second state, applying electrical signals having an identical polarity to the movable member and the fixation member, to enable the movable member to move in a direction away from the fixation member in such a manner that a sum of orthogonal projections of the movable member and the fixation member onto the first base substrate covers the entire orthogonal projection of the color filter unit corresponding to the light valve onto the first base substrate.

12. The method according to claim 11, wherein for each of the plurality of light valves, the movable member is arranged parallel to the fixation member and is capable of moving on a plane parallel to the fixation member.

\* \* \* \* \*